(12) United States Patent
Fu et al.

(10) Patent No.: US 9,130,758 B2
(45) Date of Patent: *Sep. 8, 2015

(54) RENEWAL OF EXPIRED CERTIFICATES

(75) Inventors: Christina Fu, Saratoga, CA (US); Ade Lee, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 720 days.

This patent is subject to a terminal disclaimer.

(21) Appl. No.: 12/616,036

(22) Filed: Nov. 10, 2009

(65) Prior Publication Data

US 2011/0113239 A1    May 12, 2011

(51) Int. Cl.
*H04L 29/06* (2006.01)
*H04L 9/32* (2006.01)

(52) U.S. Cl.
CPC ............ *H04L 9/3268* (2013.01); *H04L 9/3226* (2013.01); *H04L 63/0823* (2013.01); *H04L 63/123* (2013.01); *H04L 63/166* (2013.01); *H04L 2209/60* (2013.01); *H04L 2209/805* (2013.01)

(58) Field of Classification Search
CPC . H04L 63/0823; H04L 9/3263; H04L 9/3268; H04L 9/0891
USPC .................................. 713/155, 156, 158, 157
See application file for complete search history.

(56) References Cited

U.S. PATENT DOCUMENTS

| | | |
|---|---|---|
| 6,615,347 B1 | 9/2003 | de Silva et al. |
| 7,047,409 B1 | 5/2006 | Aull et al. |
| 7,415,607 B2 * | 8/2008 | Sinn ............................. 713/158 |
| 7,484,089 B1 * | 1/2009 | Kogen et al. .................. 713/156 |
| 2005/0076203 A1 * | 4/2005 | Thornton et al. ............. 713/156 |
| 2007/0186097 A1 * | 8/2007 | Arditti et al. .................. 713/156 |

OTHER PUBLICATIONS

Red Hat Certificare System 8.0—Admin Guide, Publication date Jul. 22, 2009, 552 pages, http://docs.redhat.com/docs/en-US/Red_Hat_Certificate_System/8.0/pdf/Admin_Guide/Red_Hat_Certificate_System-8.0-Admin_Guide-en-US.pdf.*
Department of Defense, "Class 3 public key infrastructure Public key-enabled application requirements", Jul. 2000, pp. 1-67 http://bluecoat-02/?cfru=aHR0cDovL2ppdGMuZmhl-LmRpc2EubWlsL3BraS9kb2N1bWVudHMvZG9kX3BraV9wdWJsaWNfa2V5X2luZnJhc3RydWRfYXBwbGljYXRpb25fcmVxVxdWlyZW1lbnRzX3YxXzA3X2p1bHlfMjAwMC5kb2M=.*
Red Hat., "Red Hat Certificate System 7.3 Administration Guide", May 2007, pp. 1-361 https://access.redhat.com/site/documentation/en-US/Red_Hat_Certificate_System/7.3/pdf/Administration_Guide/Red_Hat_Certificate_System-7.3-Administration_Guide-en-US.pdf.*

(Continued)

*Primary Examiner* — Jung Kim
*Assistant Examiner* — Carlos M De Jesus Lassaia
(74) *Attorney, Agent, or Firm* — Lowenstein Sandler LLP

(57) ABSTRACT

A method and system for renewal of expired certificates is described. In one embodiment, a method, implemented by a computing system programmed to perform operations, includes receiving, at a certificate manager of a computing system from a requester, a certificate renewal request for an original digital certificate that has already expired, and renewing the expired certificate as a renewed certificate by the certificate manager when the certificate renewal request is approved. The renewed certificate comprises the same key pair as the original certificate, but includes a new expiration date, and wherein the renewed certificate is functionally identical to the original certificate.

20 Claims, 9 Drawing Sheets

(56) References Cited

OTHER PUBLICATIONS

Red Hat., "Red Hat Certificate System 7.3 Administration Guide", May 2007, pp. 1-361 https://access.redhat.com/site/documentation/en-US/Red_Hat_Certificate_System/7.3/html-single/Administration_Guide/index.html.*

Department of Defense, "Class 3 public key infrastructure Public key-enabled application requirements", Jul. 2000, pp. 1-67 http://jitc.fhu.disa.mil/pki/documents/dod_pki_public_key_enabled_application_requirements_v1_07_july_13_2000.doc.*

Red Hat et al. "Red Hat Certificate System 7.1 Administrator's Guide", Sep. 2005, pp. 1-840 http://www.manualslib.com/manual/395408/Redhat-Certificate-System-7-1-Administrator.html?page=126#manual.*

Red Hat., "Red Hat Certificate System 7.3 Administration Guide", May 2007, pp. 1-361 https://access.redhat.com/site/documentation/en-US/Red_Hat_Certificate_System/7.3/html-single/Administration_Guide/index.html.*

Department of Defense, "Class 3 public key infrastructure Public key-enabled application requirements", Jul. 2000, pp. 1-67 http://jitc.fhu.disa.mil/pki/documents/dod_pki_public_key_enabled_application_requirements_v1_07July_13_2000.doc.*

Red Hat., "Red Hat Certificate 7.3 Administrator's Guide", Sep. 2008, pp. 1-646 http://wsm.mxhosting.pl/Administration_Guide.pdf.*

Red Hat Certificate System 8.0—Admin Guide, Publication date Jul. 22, 2009, 108 pages, published at http://www.redhat.com/docs/manuals/cert-system/8.0/admin/Admin_Guide.pdf.

"Red Hat Certificate System 8.0 Admin Guide", Publication date: Jul. 22, 2009, 552 pages http://docs.redhat.com/docs/en-US/Red_HatCertificate_System/8.0/pdf/Admin_Guide/Red_Hat_Certificate_System-8.0-Admin_Guide-en-US.pdf.

Red Hat Certificate System 8.0—Admin Guide, Publication date Jul. 22, 2009, 108 pages, published at http://www.redhatcomidocsimanualsicert-system/8.0/adminlAdmin Guide.pdf.

Office Action for U.S. Appl. No. 12/616,056 mailed Mar. 15, 2012.

Office Action for U.S. Appl. No. 12/616,056 mailed Oct. 23, 2012.

USPTO, Final Office Action for U.S. Appl. No. 12/616,056 mailed May 21, 2013.

USPTO, Advisory Action for U.S. Appl. No. 12/616,056 mailed Aug. 14, 2013.

USPTO, Office Action for U.S. Appl. No. 12/616,056 mailed Nov. 4, 2013.

USPTO, Final Office Action for U.S. Appl. No. 12/616,056 mailed Apr. 8, 2014.

USPTO, Advisory Action for U.S. Appl. No. 12/616,055 mailed Jun. 26, 2014.

USPTO, Office Action for U.S. Appl. No. 12/616,056 mailed Oct. 2, 2014.

* cited by examiner

800

| Enrollment/Renewal | Revocation | Retrieval |

CERTIFICATE PROFILE
Use this form to submit the request.

Certificate Profile – Renew Certificate to be manually approved by agents
This certificate profile is for renewing certificates to be approved manually by agents.

Inputs ⎯ 802

Serial Number of Certificate to Renewed
• Serial Number of Certificate to Renew [ ⎯ 804 ]

[ SUBMIT ]

FIG. 8

RENEWAL OF EXPIRED CERTIFICATES

RELATED APPLICATION

This application is related to U.S. application Ser. No. 12/616,056, entitled "Certificate Renewal Using Enrollment Profile Framework," filed herewith, which is incorporated herein by reference.

TECHNICAL FIELD

Embodiments of the invention relate to the field of digital certificate management, and more particularly, to digital certificate renewal.

BACKGROUND

Authentication is the process of confirming an identity. For network interactions, authentication involves the identification of one party by another party. There are many ways to use authentication over networks, such as password-based authentication and certificate-based authentication. A digital certificate, commonly referred to as a certificate, is an electronic document used to identify an individual, a server, a company, or another type of entity and to associate that identity with a public key. Certificates have the purpose of establishing trust. Their usage varies depending on the kind of trust they are used to ensure.

Network interactions typically take place between a client, such as a web browser, and a server. Client authentication refers to the identification of a client (the person assumed to be using the software) by a server, while server authentication refers to the identification of a server (the organization assumed to be running the server at the network address) by a client. Client authentication and server authentication are not the only forms of authentication that certificates support. For example, the digital signature on an email message, combined with the certificate that identifies the sender, can authenticate the sender of the message. Similarly, a digital signature on an HTML form, combined with a certificate that identifies the signer, can provide evidence that the person identified by that certificate agreed to the contents of the form. In addition to authentication, the digital signature in both cases ensures a degree of non-repudiation, because a digital signature makes it difficult for the signer to claim later not to have sent the email or form.

There are two main types of certificates: signing certificates and encryption certificates; although there may be other types of certificates as well. Also, some certificates may be dual-use certificates, such as certificates that operate as a signing certificate as well as an encryption certificate. One example of a signing certificate is a client Secure Sockets Layer (SSL) certificate. A client SSL certificate is used for client authentication to servers over SSL. The SSL protocol governs server authentication, client authentication, and encrypted communication between servers and clients. When using a SSL client certificate to authenticate a client to a server, it is assumed that the client presents a valid certificate that can be used to identify the client to the server. For example, a bank gives a customer an SSL client certificate that allows the bank's servers to identify that customer and authorize access to the customer's accounts. In another example, a company gives a new employee an SSL client certificate that allows the company's servers to identify that employee and authorize access to the company's servers.

Similarly, a SSL server certificate is used for server authentication to clients over SSL. For example, Internet sites that engage in electronic commerce usually support certificate-based server authentication to establish an encrypted SSL session and to assure customers that they are dealing with the web site identified with the company. The encrypted SSL session ensures that personal information sent over the network, such as credit card numbers, cannot easily be intercepted. Server authentication may be used with or without client authentication.

Certificate authorities (CAs) validate identities and issue certificates. CAs can be either independent third parties or organizations running their own certificate-issuing server software, such as a certificate system. The methods used to validate an identity vary depending on the policies of a given CA for the type of certificate being requested. Before issuing a certificate, a CA must confirm the user's identity with its standard verification procedures. The certificate issued by the CA binds a particular public key to the name of the entity identified by the certificate, such as the name of an employee or a server. Only the public key included in the certificate will work with the corresponding private key possessed by the entity identified by the certificate.

In addition to a public key, a certificate typically includes the name of the entity it identifies, an expiration date, and the name of the CA that issued the certificate. In most cases, a certificate also includes the digital signature of the issuing CA. The CA's digital signature allows the certificate to serve as valid credentials for users who know and trust the CA but may not know the entity identified by the certificate. Since certificates have an expiration date, such as, for example, 2-3 years, certificates need to be renewed to avoid expiration. Conventional certificate systems have typically been implemented in a policy framework, in which a policy set defines the available renewal features and corresponding requirements, such as a requirement that a valid, non-expired SSL client certificate has to be presented to approve a renewal request. When the certificate system requires that a requester use a valid, non-expired SSL certificate in order to renew the certificate, the requesting client presents its valid SSL certificate to the certificate system to authenticate the client's identity before the renewal request can be approved. This approach may limit the types of certificates that can be renewed, since not all certificates are SSL certificates. This approach may also limit renewal requests to certificates that have not expired, since a valid, non-expired certificate is required to be presented with the renewal request. This approach is inflexible to scenarios where an entity inadvertently fails to renew the certificate before the expiration date, or where it is impractical or impossible to renew the certificate before the expiration date.

Existing certificate systems fail to provide adequate mechanisms to renew all types of digital certificates, and conventionally are limited to non-expired, signing certificates.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 8 illustrates an exemplary web page presented to a user by the certificate system containing a renewal request form according to one embodiment.

DETAILED DESCRIPTION

Figure 1:
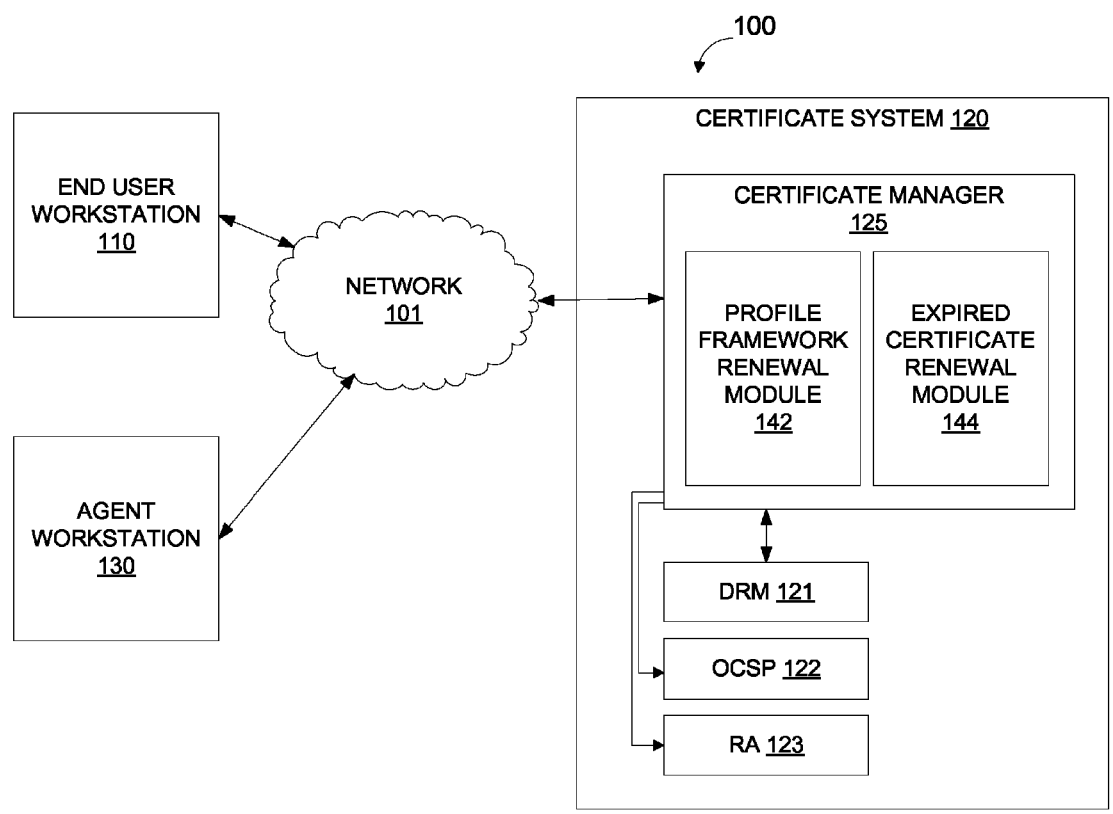
FIG. 1 is a block diagram of exemplary system architecture in which embodiments of a certificate system may operate.

A method and system for renewal of expired certificates is described. In one embodiment, a method, implemented by a computing system programmed to perform operations, includes receiving from a requester at the certificate manager, a certificate renewal request for an original digital certificate that has already expired, and renewing the expired certificate as a renewed certificate by the certificate manager when the certificate renewal request is approved. The renewed certificate comprises the same key pair as the original certificate, but includes a new expiration date. The renewed certificate is functionally identical to the original certificate.

Embodiments of the present invention provide an improved approach to certificate renewal. By allowing renewal of expired certificates, the renewal process provides flexibility to scenarios where an entity inadvertently fails to renew the certificate before the expiration date, or where it is impractical or impossible to renew the certificate before the expiration date.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "presenting," "receiving," "approving," "renewing," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a certificate system may operate. The architecture 100 includes an end user workstation 110, a certificate system 120, and an agent workstation 130, each coupled to the network 101 that communicates any of the standard protocols for the exchange of information. The network 101 may be a Local Area Network (LAN) and may be incorporated into the same physical or logical system, or different physical or logical systems. Alternatively, the certificate system 120, end user station 110, and agent workstation 130 may reside on different LANs that may be coupled together via the Internet but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120 and the end user workstation 110 and/or the agent workstation 130.

The certificate system 120 may be hosted on one or more machines including one or more server computers, gateways or other computing systems. In one embodiment, the certificate system 120 resides on multiple servers, including a CA server that hosts the certificate manager 125, and the end users and/or agents can interact with the certificate system 120 via web browser applications on the end user workstation 110 and/or on the agent workstation 130. It should be noted that various other network configurations can be used including, for example, hosted configuration, distributed configurations, centralized configurations, etc.

The certificate manager 125 may operate as a CA that can issue, renew, revoke, and publish a wide variety of certificates, for servers, for users, for routers, for other subsystems, and for file or object signing. The certificate manager 125 can be implemented as software, hardware, firmware or any combination of the above. The certificate manager 125 is the core of a CA's Public Key Infrastructure (PKI). The PKI is a set of hardware, software, people, policies, and procedures needed to create, manage, distribute, use, renew, and revoke digital certificates. The certificate manager 125 can also compile and publish certificate revocation lists (CRLs). The certificate manager 125 may be structured in series with other certificate managers 125. The certificate manager 125, which is sometimes referred to as the CA server, can establish and maintain relationships between other subsystems of the certificate system 120, including a key recovery authority 121, sometimes called a data recovery manager (DRM), an online certificate status responder (OCSP) 122, and a registration authority (RA) 123.

Certificates are created based on a specific and unique key pair. If a private key is ever lost, then the data which that key was used to access (such as encrypted emails) is also lost because it is inaccessible. The DRM 121 stores key pairs, so that a new, identical certificate can be generated based on recovered keys, and all the encrypted data can be accessed even after a private key is lost or damaged. The OCSP 122 verifies whether a certificate is valid and not revoked. This function can also be done by the certificate manager 125, which has an internal OCSP service, but using an external OCSP eases the load on the issuing CA (certificate manager 125). An RA 123 accepts certificate requests and verifies, independently, whether that request should be approved. It then forwards approved requests to the certificate manager 125 to issue the certificate. Like the OCSP, this is a function that can be performed by the certificate manager 125, but using a separate subsystem reduces the load on the certificate manager 125.

The end user workstation 110 and the agent workstation 130 may each be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. In one embodiment, the end user workstation 110 and the agent workstation 130 each provides web browsing capabilities to render images, documents, etc., in a web browser using uniform resource locators (URLs) or links specified by a user (e.g., by activating a link). The web browser allows a user to access a GUI provided by the certificate system 120. The GUI may present to a requester multiple profiles of an enrollment profile framework, including the renewal request profiles. This may be presented to the end user in the form of a list from which the user selects a particular profile. The GUI may also allow the user of the end user workstation 110 or agent workstation 130 to input data along with the profile request, such as the expired or expiring certificate to be renewed, a username and password, a serial number assigned to the certificate for the particular instance of the CA, or the like.

In one embodiment, the certificate manager 125 includes a profile framework renewal module 142 described in detail below. In another embodiment, the certificate manager 125 includes an expired certificate renewal module 144 described in detail below. In another embodiment, the certificate manager 125 includes both the profile framework renewal module 142 and the expired certificate renewal module 144 as depicted in FIG. 1.

In one embodiment, the certificate manager 125 implements a customizable profile framework to apply policies for incoming certificate requests and to control the input request types and output certificate types using the profile framework renewal module 142. The profile framework, also referred to as the enrollment profile framework, is used to approve and issue certificates according to the selected profile, and is implemented by the profile framework renewal module 142. There are two main types of certificate profiles in the profile framework—enrollment request profiles and renewal request profiles. Enrollment is the process for requesting and receiving an issued certificate. The mechanics for the enrollment process may depend on the type of certificate, the method for generating its key pair, and the method for generating and approving the certificate itself.

A certificate profile usually contains inputs, policy sets, and outputs. The certificate profile configures the entire set of rules concerning the issuing or renewing of a certificate, for example, the kind of content that is required to submit the request, the way the request is processed and approved (authenticated and authorized), the information that is included in the certificate content, and how long the certificate is valid. For example, the certificate profile may define the type of certificate, the authentication method, the authorization method, the certificate content (defaults), constraints for the values of the content, and the contents of the input and output for the certificate profile usually contains inputs, policy sets, and outputs. In particular, the profiles may also define the limits on expiration dates, grace periods within which certificates can be renewed, a type of cipher allowed, and information to be included in the issued or renewed certificate, how the certificate may be used, and/or how long the issued or renewed certificate is valid. The certificate profiles may be stored in memory and accessed by the certificate manager 125 when needed. Enrollment and renewal requests are accessed by the certificate manager 125 to subject the requests to the defaults and constraints set in that certificate profile. These constraints are in place whether the request is submitted through the input form, associated with the certificate profile, or through other means. The certificate that is issued from a certificate profile request contains the content required by the default parameters. The constraints provide rules for what content is allowed in the certificate. In one embodiment, all the information about a certificate profile is defined in a profile policy set entry in the profile's configuration file, and then the profile is listed in the CA's certificate systems configuration file.

Certificate enrollment, at a high level, may have the following basic steps: a user generates a certificate request and submits to the CA, for example, using a web-based profile form, as described herein. The CA verifies the request by authenticating the requesting entity and confirming that the request meets the certificate profile rules which were used to submit the request. The CA then approves the request, and the user retrieves the new certificate. The CA verifies an enrollment request by authenticating the entity which requested it and by confirming that it meets the certificate profile rules which were used to submit the enrollment request. The CA then approves the enrollment request, issues the certificate, and allows the user to retrieve the new certificate. When the certificate reaches the end of its validity period (as indicated by the expiration date), the certificate can be renewed based on the enrollment profile framework using the same profile framework renewal module 142, for example, using a web-based profile form. The profile framework renewal module 142 receives from a requester (i.e., user on the end user workstation 110 or on the agent workstation 130) a certificate renewal request according to one of the renewal request profiles for an original digital certificate that has been issued by the certificate manager 125. The profile framework renewal module 142 approves the certificate renewal request according to the selected renewal request profile and renews the original certificate as a renewed certificate when the certificate renewal request is approved.

In one embodiment, the profile framework renewal module 142 handles the renewal requests (such as those submitted via a renewal request form presented to the user on the end user station 110) as new enrollment requests, and issues a new key pair for the new certificates. In this embodiment, the profile framework renewal module 142 issues a new key pair for the renewed certificate and sets a new expiration date for the renewed certificate, but uses some information from the original certificate to generate the renewed certificate despite issuing a new key pair for the certificate. For example, the profile framework renewal module 142 can use the same subject distinguished name (DN) of the original certificate as a subject DN for the renewed certificate. Alternatively, other information than the subject DN can be used from the original certificate in the renewed certificate that includes the new key pair.

Although there may be some circumstances where it is desirable to issue a new key pair for the renewed certificate, in many circumstances, issuing a new key pair can be disruptive since the new certificates will not be functionally identical to the original certificates. For example, an entity that already has the original certificate will need to update all instances of the expired certificate with the renewed certificate, since the original certificate will expire or has already expired and the renewed certificate has different key pairs than the original certificate.

In other embodiments, the profile framework renewal module 142 does not handle the renewal request as new enrollment request, but rather reuses the key pair of the original certificate for the renewed certificate. In one embodiment, the profile framework renewal module 142 reuses a key pair of the original certificate for the renewed certificate and sets a new expiration date for the renewed certificate. In this embodiment, the renewed certificate is functionally identical to the original certificate. This allows entities already using the original certificate to use the renewed certificate in place of the original certificate, since the renewed certificate is functionally identical to the original certificate. A certificate system that renews a certificate with the same key pair can be a cleaner and faster solution for handling the expiration of many kinds of certificates (especially CA signing certificates), than a certificate system that simply generates a new key pair and installs new certificates for renewal requests. For example, if a new CA signing certificate is created, all the certificates which this CA issued and signed must be reissued. If the CA signing certificate is renewed with the same keys, then all the issued certificates are still valid.

In one embodiment, the renewal forms use a serial number associated with a record in the CA database of the enrollment request for the original certificate, the certificate itself, or other information to identify the certificate entry in the CA database associated with the CS 120. The certificate entry may be a record in the CA database that contains the original certificate and/or the original enrollment request. In this embodiment, the renewal process finds the original key, certificate request, and/or profile, and regenerates the certificate with an updated expiration date as described in more detail below. In another embodiment, the profile framework renewal module 142 can receive a valid SSL client certificate in connection with the certificate renewal request, and the profile framework renewal module 142 authenticates the identity of the requester via the SSL client certificate.

In another embodiment, the certificate manager 125 includes an expired certificate renewal module 14, which is used to renew an original certificate that has been previously issued by the certificate manager 125, but has already expired. For example, when the certificate manager 125 receives a certificate renewal request for an expired certificate, the expired certificate renewal module 144 verifies the certificate renewal request by authenticating the entity which requested it, finding a record in the CA database that contains the original certificate, matching the identity of the requester and the identity of the original certificate, and generating a renewed certificate when the request is approved.

In another embodiment, the certificate manager 125 implements both the profile framework renewal module 140 and the expired certificate renewal module 144. For example, the profile framework renewal module 142 may include certificate renewal profiles for expired certificates and the certificates can be renewed by the certificate manager 125 according to those profiles. It should also be noted that embodiments of the expired certificate renewal module 144 may be implemented without the profile framework. For example, a policy framework may be used in connection with the embodiments described herein that renew expired certificates.

Figure 2:
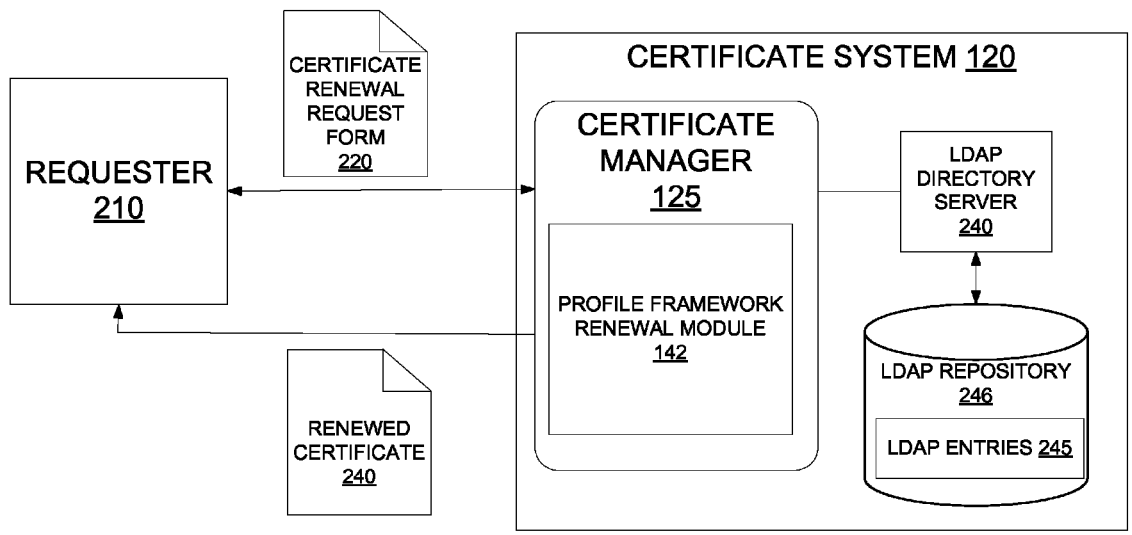
FIG. 2 is a block diagram of one embodiment of a certificate manager that manages certificate renewals using an enrollment profile framework by the profile framework renewal module of FIG. 1.

FIG. 2 is a block diagram of one embodiment of the certificate manager 125 that manages certificate renewals using an enrollment profile framework by the profile framework renewal module 142 of FIG. 1. The profile framework renewal module 142 may present a certificate renewal request form 220 to the requester 210. The requester 210 may be a user on the end user workstation 110 or a user on the agent workstation 130. The profile framework renewal module 142 may present the certificate renewal request form 220 in response to the requester selecting the particular renewal request profile corresponding to the certificate renewal request form 220. The renewal request form 220 may be generated based on the particular renewal profile. Once the user submits the certificate renewal request form 220 with the necessary inputs, if any, the profile framework renewal module 142 determines whether to approve the certificate renewal request according to the renewal request profile. If the profile framework renewal module 142 approves the certificate renewal request, the profile framework renewal module 142 renews the original certificate as a renewed certificate 240. The profile framework renewal module 142 can then issue the renewed certificate, for example, by sending back to the requester the renewed certificate or by sending a link to a location where the renewed certificate can be retrieved by the requester 210.

In one embodiment, the certificate renewal request form 220 includes input fields that allow the requester 210 to provide input, for example, the original certificate, a serial number identifying the original certificate, a username and password, etc., in connection with the certificate renewal request 220. For example, FIG. 8 illustrates an exemplary renewal request form of a web page 800 presented to the end user on the end user workstation 110 by the certificate system 120. The certificate manager 125 may present the web page 800 in response to the user selecting the particular type of renewal request from the list of available profiles (i.e., another web page that lists the available request profiles). The web page 800 indicates that type of renewal request selected by the user and includes a renewal request form 802 that includes an input mechanism 804 that allows the user to input additional information for this particular type of request. This particular renewal request form 802 is for the certificate profiles for renewing a certificate to be approved manually by an agent, but other renewal request forms may be used. In the depicted embodiment, the renewal request form 802 includes an input box that allows the user to input a serial number of the certificate to be renewed. The certificate manager 125 may use the serial number to find a record containing the original digital certificate and/or the enrollment request of the original digital certificate, as described in more detail below. After inputting the serial number, the user sends the renewal request form 802 to the certificate manager 125, for example, by activating the submit button 806 on the renewal request form.

Referring back to FIG. 2, when the user submits a renewal request, they provide some kind of information to identify which certificate to renew. This can be the serial number or the certificate itself. In one embodiment, the profile framework renewal module 142 accesses a CA database to find the original key, the profile used for enrollment, and/or the original enrollment request for the original certificate that is being renewed. The profile framework renewal module 142 identifies the certificate and then maps the renewal request to the initial certificate enrollment request entry in a CA database. The CA database may be implemented, for example, using various types of database technologies. In one embodiment, as depicted in FIG. 2, the certificate system 120 implements the CA database using a Lightweight Directory Access Protocol (LDAP) directory server 240 that manages LDAP entries 245 stored in the LDAP repository 246. LDAP is a set of open protocols used to access centrally stored information over a network. LDAP organizes information in a hierarchical manner using directories. These directories can store a variety of information and can enable access to the information from any machine on the LDAP enabled network. Alternatively, the CA database may be stored on other types of data storage devices using other types of databases or directories.

In one embodiment, the LDAP entry includes the original certificate. In other embodiments, the LDAP entry may contain, along with the original certificate, the original profile used to enroll the original certificate, its public key, the subject DN, the original certificate request, original validity period, grace period, the original certificate's extension, etc., for example. If a certificate is outside of the grace period, the renewal request is automatically rejected, in some embodiments. In other embodiments, the certificate manager 125 can renew expired certificates, as described in more detail below.

In one embodiment, a user submits a renewal request with a serial number (as illustrated in FIG. 8), the profile framework renewal module 142 maps the serial number to one of the LDAP entries 246 in the LDAP repository 240. The profile framework renewal module 142 can access the LDAP entry or extract information from the LDAP entry corresponding to the original enrollment request. In one embodiment, the profile framework renewal module 142 then retrieves at least the public key from the LDAP entry. In another embodiment, the profile framework renewal module 142 retrieves the public key and the original enrollment request from the LDAP entry. The profile framework renewal module 142 generates the renewed certificate from the information stored in the LDAP entry. For example, the profile framework renewal module 142 issues a new certificate with a new validity period and with the same key pair as the original or with a new key pair.

In one embodiment, if more than one certificate matches the renewal request, then the profile framework renewal module 142 may use the most recent certificate entry. In one embodiment, the renewal request needs to be submitted to the same CA which issued the original certificate in order to access entries in the CA database. This allows the profile framework renewal module 142 to map the serial number to the appropriate original certificate. Alternatively, other information may be used to access map the renewal request to the original certificate, such as, the public key. When the original certificate has been issued by another CA, then other mechanisms may be used to access the entries corresponding to the original certificate request, such as a password-based authentication to the CA's database storing the information, or other mechanisms that would be appreciated by one of ordinary skill in the art having the benefit of this disclosure.

Like enrollment requests, a renewal request has to be approved before the CA will issue the new certificate. In one embodiment, the certificate system 120 uses three renewal profiles that determine the authorization method used to verify the requester 210—1) agent-based renewal profile, where the agent manually approves the renewal request; 2) self-renewal, directory-based authentication profile, where the requester authenticates to the CA database (e.g., LDAP directory); and 3) a certificate-based renewal profile, also referred to as SSL client authentication profile, where the certificate stored in the requesting browser's database is used to authenticate the requester. In one embodiment, each of the three certificate renewal request profiles has a corresponding renewal request form that can be presented to the end entity (i.e., a user on the end user workstation 110 or a user on the agent workstation 130). Each of these three renewal profiles defines whether renewal is allowed, the input, if any, to use to locate the original certificate, and the output of the regenerated certificate. The input depends on the way that the certificate renewal request is authorized.

For the agent-based renewal profile, the certificate renewal request may be for a user submitting the renewal request for themselves or on behalf of a server (e.g., SSL server), as well as other types of certificates that need to be manually approved by an agent acting on behalf of the CA (CA agent or RA agent acting on behalf of another entity, for example, users). For agent-approved and directory-based authorization profiles, the identity of the requester is verified independently, and then the specified certificate is located, for example, using the serial number. For agent-based authentication, no automatic authorization method is required, since the renewal request will be manually reviewed and approved by a CA agent.

For the self-renewal, directory-based authentication profiles, the requester provides input in connection with the certificate renewal request, such as a username and password, to authenticate against an LDAP directory. It should be noted that although various embodiments of the directory-based authentication is described with respect to an LDAP directory, in other embodiments, other types of authentication mechanisms may be used other than LDAP authentication for the directory-based authentication.

For certificate-based self renewal, the certificate is presented directly by the browser being used to submit the renewal forms. For the self-renewal profile, the user submitting the renewal request is named on the subject DN of the original certificate. In this case, the certificate is used both to verify the identity of the requester and to get the certificate information for renewal. When renewing a SSL client certificate using the self-renewal profile, the profile framework renewal module 142 can authenticate and authorize the certificate renewal request upon receiving a valid SSL client certificate in connection with the certificate renewal request. It should be noted that for self renewal profile, it is not necessary to specify a serial number input. It should also be noted that the certificate-based renewal method may require that the certificate that is presented directly by the browser be a valid, non-expired certificate. In another embodiment, if the certificate is expired, the certificate manager 125 may authenticate the user using other methods and may use the expired certificate to extract the certificate information for the renewed certificate.

Figure 3A:
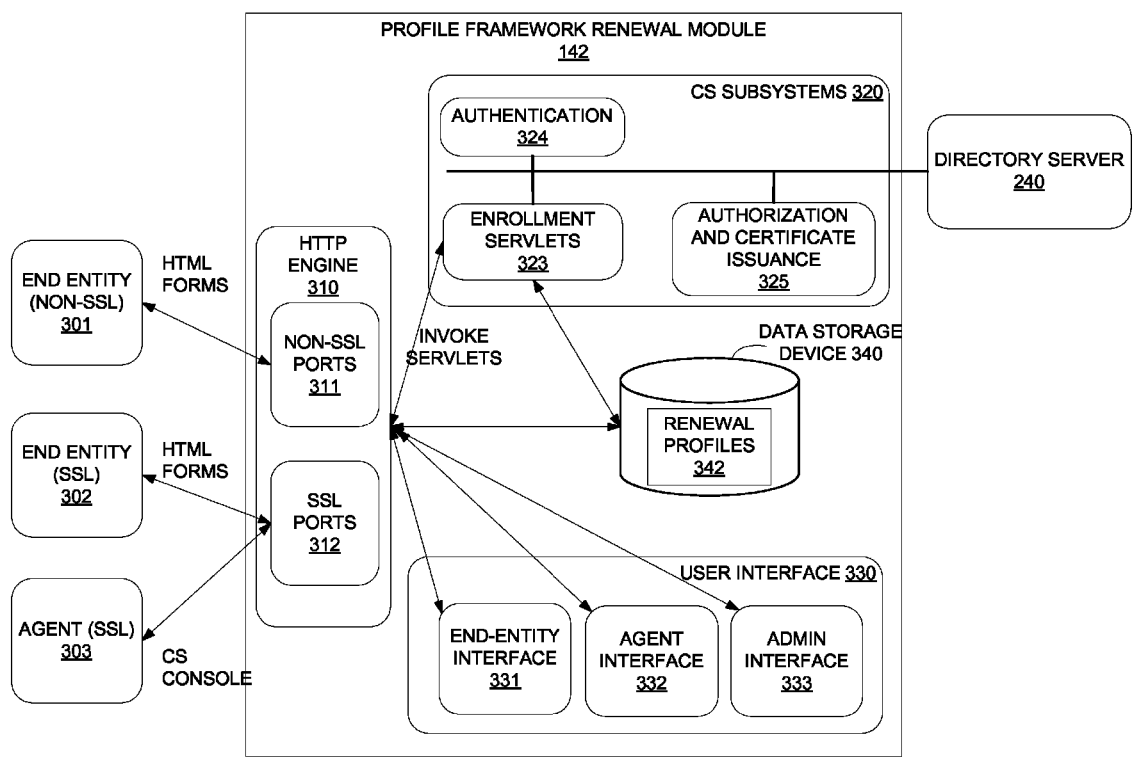
FIG. 3A is a block diagram of the profile framework renewal module of FIG. 2 according to one embodiment.

FIG. 3A is a block diagram of the profile framework renewal module 142 of FIG. 2 according to one embodiment. The profile framework renewal module 142 of FIG. 3 is configured to receive certificate renewal requests according to the three certificate renewal request profiles described above. In the depicted embodiment, the profile framework renewal module 142 includes a Hypertext Transport Protocol (HTTP) engine 310 that receives the certificate renewal request as a HTTP request over a network connection from a non-SSL end entity 301, a SSL end entity 302, or an agent 303. The HTTP engine 310 presents and receives an HTML form with the selected renewal request to the non-SSL end entity 301 via non-SSL ports 311, and to the SSL end entity 302 via SSL ports 312. The HTTP engine 310 presents and receives information from the agent via a certificate system (CS) console via the SSL ports 312.

In the depicted embodiment, the profile framework renewal module 142 provides three different interfaces for managing communications between the end entities 301 and 302 and the agent 303 and the CS subsystem 320, depending on the user type: administrators, agents, and end users. The administrative interface 333 is used to manage the certificate manager 125 itself. This includes adding users, configuring logs, managing profiles and plug-ins, and the CA database, among many other functions. This administrator interface 333 does not directly deal with certificates or keys for managing the PKI, but rather managing the server on which the certificate manager 125 is operating. In one embodiment, the administrator interface 333 may be a Java-based administrative console. Alternatively, the administrator interface 333 may be a HTML-based administrative console. Although these types of interfaces are different, both may be accessed using a server URL and the administrative port number.

The agent interface 332 is used to manage communications between the agent 303 and the profile framework renewal module 142. As described above, the agent interface 332 may be in the form of web pages, referred to herein as agent service pages. The agent services pages are used to perform certificate tasks. In one embodiment, these services are HTML-based, and the agent 303 authenticates to the website (certificate manager 125) using a special agent certificate. The agent services may include approving certificate requests, approving renewal requests, revoking certificates, and publishing certificates and CRLs. In one embodiment, all certificates issued by the CA can be managed through its agent services pages.

The end-entity interface 331 is used to manage communications between the end entities 301 and 302 and the certificate manager 125. As described above, the end-entity interface 331 may be in the form of web pages, referred to herein as end-entity service pages. The end-entity services pages are used to perform certificate requests, such as enrollment and renewal requests, as well as other certificate related operations. In one embodiment, these services are HTML-based, and are accessed over standard HTTP or HTTPS; for example, using the server's hostname and the standard port number, such as the non-SSL ports 311, or using the server's hostname and the specific end-entities SSL port, such as the SSL ports 312. In one embodiment, each type of certificate renewal is processed through a specific online submission form (e.g., HTLM form), referred to herein as requested renewal forms for each renewal request profile.

When receiving a request from one of the end entities 301, 302, or the agent 303, the HTTP engine 310 can parse information in the HTTP request using the selected renewal request profile, such as identified by a profile identifier (ID), to determine whether to approve the certificate renewal request. In one embodiment, the HTTP engine 310 parses the information by extracting information from at least one of an authenticator field that includes user identification information for authenticating the requester, and an input field that includes the original certificate being renewed or a serial number. In another embodiment, the certificate renewal request includes the original certificate being renewed and this certificate is a SSL client certificate, for example, received from a browser database of a browser used by the requester. In other embodiments, when the original certificate is not a SSL client certificate.

In one embodiment, the renewal request form includes the same profile ID as a profile ID of an enrollment request for the original certificate. Based on the profile identifier, the HTTP engine 310 can present the appropriate interface (i.e., web page having the appropriate renewal request form) to the user. For example, if the HTTP engine 310 receives an input profile selection from the end-entity 301 or 302, the HTTP engine 310 presents the appropriate HTML form using the end-entity (EE) interface 312; whereas in response to receiving input from the agent 303, the HTTP engine 310 can present and/or receive commands from the administrative console for a particular renewal request.

When the HTTP engine 310 receives the completed HTML form or the command on the console, the HTTP engine 310 invokes the appropriate enrollment servlet 323 that interacts with other components of the CS subsystem 320 as necessary. In one embodiment, the enrollment servlet 323 is software code, such as Java code, that handles a particular kind of interaction with end entities on behalf of the CS subsystem 320. The enrollment servlet 323 handles the certificate renewal requests according to the particular renewal request profile, as it does for the enrollment requests. In some cases, once the original enrollment request is found for the digital certificate being renewed, the original enrollment request is reprocessed by the same enrollment profile as the original certificate to determine whether to approve the certificate renewal request. The authentication module 324 may include a set of rules (e.g., implemented as a Java™ class) for authenticating an end entity 301 or 302, agent 303, administrator, or any other entity that needs to interact with the CS subsystem 320. In the case of typical end-user renewal, after the user has supplied the information requested by the renewal request form, the enrollment servlet 323 uses the authentication module 324 associated with that form to validate the information and authenticate the user's identity. Once validated, the enrollment servlet 323 passes the certificate renewal request to an authorization and certificate issuance module 325, which determines whether the certificate renewal request has been approved and issues the certificate. In one embodiment, the profile processing of the authorization and certificate issuance module 325 issues a new key pair for the renewed certificate and sets a new expiration date for the renewed certificate. The renewed certificate may include the same subject DN as the subject DN of the original certificate, as well as other settings and constraints from the original certificate. In another embodiment, the profile processing of the authorization and certificate issuance module 325 reuses keys of the original certificate for the renewed certificate the renewed, and sets a new expiration date for the renewed certificate. In this embodiment, the renewed certificate is functionally identical to the original certificate. In one embodiment, the profile framework renewal module 142 automatically sends the renewed certificate to the requester. In another embodiment, the profile framework renewal module 142 provides a link to where the renewed certificate can be accessed for download.

In another embodiment, the certificate renewal request needs to be manually authenticated. With this form of authentication, the enrollment servlet 323 forwards a certificate renewal request to a request queue after successful authentication by the authentication module 324. An agent with appropriate privileges must then approve each request individually before the profile processing can be performed by the authorization and certificate issuance module 325.

In other embodiments, the authentication module 324 may access other subsystem authentication modules for specific types of authentication, such as the agent-based authentication, password-based authentication, certificate-based authentication, client authentication, server authentication, or the like. Alternatively, all of these different types of authentications may be handled by the authentication module 324.

In one embodiment, there are two authentication methods for renewing certificates—manual authentication or automatic authentication. The manual authentication may be performed by an agent manually approving the certificate renewal request of the original certificate by a CA agent. The automatic authentication may be performed when a valid SSL client certificate is presented with the renewal request. The automatic authentication may also be performed using a directory-based authentication method, in which the authentication module 324 receives user identification information, such as a username and password, and authenticates the identity of the requester using the user identification information to determine whether to approve the certificate renewal request. In this embodiment, the authorization and certificate issuance module 325 issues the renewed certificate when the requester successfully authenticates to the CA database (e.g., LDAP directory). In one embodiment, the user identification information is the username and password required to authenticate against a CA database containing either or both the original digital certificate and an enrollment request for the original digital certificate. In another embodiment, the user identification information is a LDAP user ID and password to access a LDAP directory containing an LDAP entry of an enrollment request for the original digital certificate. If the requester has access to the LDAP directory, then the identity of the requester is authenticated and the profile processing of the authorization and certificate issuance module 325 can extract the information from the original certificate and/or the enrollment request stored in the LDAP directory.

Although the embodiments of FIG. 3A illustrate and describe a web-based certificate management interface to request or receive a certificate, the profile framework renewal module 142 may provide other interfaces to the end users and agents to request or receive a certificate.

Figure 3B:
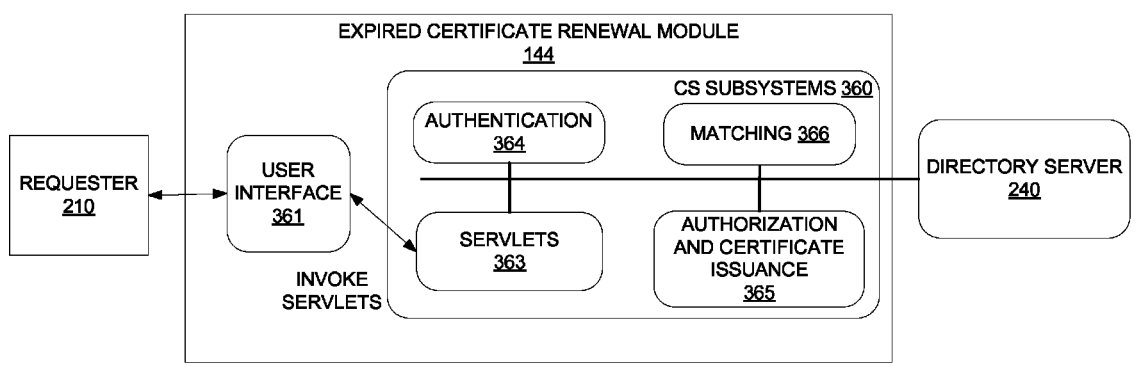
FIG. 3B is a block diagram of the expired certificate renewal module of FIG. 2 according to one embodiment.

FIG. 3B is a block diagram of the expired certificate renewal module 144 of FIG. 2 according to one embodiment. The expired certificate renewal module 144 includes a user interface 361 to receive a certificate renewal request from the requester 210. When the expired certificate renewal module 144 receives the certificate renewal request, a servlet 363 is invoked to interface with other components of the CS subsystem 320 as necessary. In one embodiment, the servlet 363 is software code, such as Java code, that handles interaction between the requester 210 and the CS subsystem 360. The authentication module 364 may include a set of rules (e.g., implemented as a Java™ class) for authenticating the requester 210. The servlet 363 uses the authentication module 364 to validate the information and authenticate the user's identity. Once authenticated, the servlet 363 accesses an LDAP entry that stores the original certificate via the directory server 240. The servlet 363 passes the authentication results by the authentication module 364 to the matching module 366 along with identity information associated with the original certificate. The matching module 366 matches the authentication results with the identity information of the original certificate. If the identities match, the servlet 363 passes the certificate renewal request to an authorization and certificate issuance module 365, which determines whether the certificate renewal request has been approved and issues the certificate. In one embodiment, the authorization and certificate issuance module 365 approves the renewal of the original certificate as the renewed certificate when the identity of the requester is authenticated and the identity of the requester matches the identity of the requester of the enrollment request. In the case of renewing already-expired certificates, the authorization and certificate issuance module 325 issues the same keys for the renewed certificate to be retrieved by the requester 210. It should be noted that while the expired certificate renewal module 144 may reissue an expired certificate, it does not reissue a revoked certificate.

Figure 4:
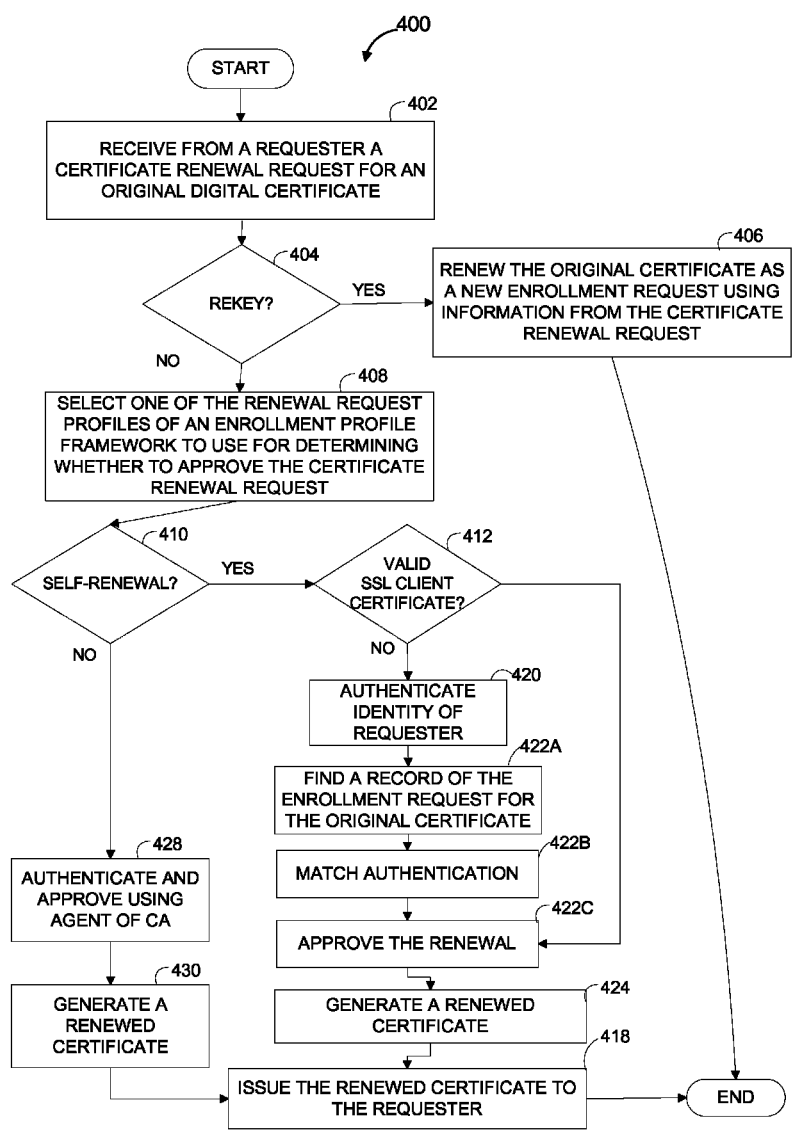
FIG. 4 is a flow diagram of one embodiment of a method of renewing an original certificate using an enrollment profile framework.

FIG. 4 is a flow diagram of one embodiment of a method 400 of renewing an original certificate using an enrollment profile framework. The method 400 is performed by processing logic that may comprise hardware (circuitry, dedicated logic, etc.), software (such as is run on a general purpose computer system or a dedicated machine), firmware (embedded software), or any combination thereof. In one embodiment, the method 400 is performed by the profile framework renewal module 142 of FIGS. 1, 2, and 3A. Alternatively, the method 400 may be performed by a certificate manager that implements a profile framework.

Referring to FIG. 4, processing logic begins with receiving a certificate renewal request for an original digital certificate at the certificate manager 125 from a requester (block 402). The processing logic determines whether the renewal type of the certificate renewal request is a re-keying type (block 404). If the certificate renewal request is a re-keying type, the processing logic renews the original certificate as a new enrollment request using information from the certificate renewal request (block 406) and/or from the original certificate being renewed, and the method ends. For example, the processing logic can use the subject names from the original certificate for the subject names of the renewed certificate, but the renewed certificate does not include the same key pair as the original certificate. In another embodiment, the processing logic finds a record in a database of the certificate system that contains a record of an enrollment request for the original certificate, and extracts information corresponding to the original certificate to generate the renewed certificate. The information corresponding to the original certificate may include the settings, constraints, subject names, etc. of the original certificate.

If at block 404, the certificate renewal request is not a re-keying type, the processing logic determines that the certificate renewal request is a reusing key type that reuses keys of the original certificate for the renewed certificate, and the processing logic selects one of the renewal request profiles of an enrollment profile framework to use in determining whether to approve the certificate renewal request (block 408).

The following operations 410-430 may be performed by the processing logic to approve the certificate renewal request according to the respective profile and to renew the original certificate as a renewed certificate when the certificate renewal request is approved.

In one embodiment, the processing logic makes the selection by presenting to the requester, such as via a web page for the CA services, multiple profiles of the enrollment profile framework, including at least one renewal request profile that includes a rule that defines how the certificate renewal request is approved. The requester selects one of the profiles and the processing logic presents a form for the selected renewal request profiles to the requester on a web page. The form may be configured to receive user identification information from the requester, a serial number associated with a record of an enrollment request for the original certificate from the requester, the original certificate from the requester, or the like. In one embodiment, the renewal requests go through the enrollment profile framework, in which existing profile servlets take input from the certificate renewal request, which may be a HTTP request, and parses the certificate renewal request through the profile identified by a profile identifier received as part of the certificate renewal request. The processing logic may use the profile identifier to select the appropriate renewal request profile to be used for approval of the certificate renewal request. In one embodiment, the profile identifier of the certificate renewal request is the same profile identifier as the original enrollment request. Alternatively, the profile identifiers may be different.

In another embodiment, the processing logic receives the certificate renewal request as a HTTP request over a network connection, and parses information in the HTTP requesting using the renewal request profile to determine whether to approve the certificate renewal request. In one embodiment, the processing logic parses the information by extracting information from an authenticator field that includes user identification information for authenticating the requester, and possibly matching the authentication results with the requester of the original enrollment request, as described herein, and extracting information from an input field that includes either the original certificate being renewed or a serial number of the original certificate.

The depicted embodiment illustrates three types of renewal request profiles: 1) a self-renewal, certificate based authentication profile for which the requester of the certificate renewal request is a user that is named on the subject DN of the original certificate; 2) a self-renewal, directory-based authentication profile for which the requester of the certificate renewal request is authenticated against a CA database; and 3) an agent-based profile for which the certificate renewal request is manually approved by an agent acting on behalf of an entity.

If the processing logic determines that the selected profile is a self-renewal profile at block 410, the processing logic determines if the original certificate being renewed is a valid SSL client certificate (block 412). If so, the processing logic receives the original certificate from the requester, approves the renewal of the original certificate (block 422C), and generates a renewed certificate using information from the record (block 424) according to the self-renewal, certificate-based authentication profile. In one embodiment, the original certificate (e.g., SSL client certificate) is retrieved from a browser database of a browser used by the requester to provide the certificate renewal request. In one embodiment, the renewed certificate includes the same key pair as the original certificate, but includes a new expiration date. In this embodiment, the renewed certificate is functionally identical to the original certificate. Alternatively, the information from the original certificate and/or record of the enrollment request may include one or more of the following: the keys of the original certificate, settings, constraints, subject names, or other information pertaining to the original certificate from the record. In this scenario, the original SSL client certificate is used both to verify the identity of the requester and to get the certificate information for renewal. Since the SSL certificate is not expired, upon receiving the valid certificate, the processing logic approves the certificate renewal request because the user has already been previously authenticated. After the renewed certificate is generated, the processing logic issues the renewed certificate to the requester (block 418), and the method ends.

If the processing logic determines that the original certificate being renewed is a not a valid SSL client certificate at block 412, the processing logic determines that the request profile is a self-renewal, directory-based authentication profile. When the selected profile is a self-renewal, directory-based authentication profile, the processing logic authenticates an identity of the requester the certificate renewal request (block 420). In one embodiment, the processing logic authenticates the identity of the requester using user identification information, provided by the requester. In one embodiment, the processing logic authenticates the identity of the requester by authenticating a username and password to access a database containing records of the enrollment requests. In another embodiment, the processing device authenticates the identity by authenticating a LDAP user ID and a password against an LDAP directory. The LDAP directory may contain an LDAP entry of the original digital certificate and/or the enrollment request of the original digital certificate. Alternatively, other types of user identification information may be used to authenticate the identity, such as an email address, a surname, or the like.

Once the identity is authenticated, the processing logic finds a record of an enrollment request for the original certificate in a database of the certificate system (block 422A). In one embodiment, the processing logic finds the records by searching the database using a serial number associated with an enrollment request for the original certificate. The serial number may be received in connection with the certificate renewal request. Alternatively, other information associated with the original certificate can be used to find the records of the enrollment request, such as the public key or the subject name of the original certificate, etc. The processing logic matches the identity of the requester of the certificate renewal request to an identity of a requester of the enrollment request for the original certificate (block 422B). The processing logic approves the renewal of the original certificate as the renewed certificate when the identity of the requester is authenticated and the identity of the requester matches the identity of the requester of the enrollment request (block 422C). The processing logic generates a renewed certificate using information from the record when the certificate renewal request is approved (block 424). After the renewed certificate is generated, the processing logic issues the renewed certificate to the requester (block 418), and the method ends.

If the processing logic determines that it is not a self-renewal profile at block 410, the processing logic determines that the certificate renewal request is an agent-based profile. If the selected profile is an agent-based profile, the processing logic authenticates the identity of the certificate renewal request using an agent of the CA and approves the certificate renewal request (block 428). In one embodiment, the processing logic approves the renewal of the original certificate as the renewed certificate when the processing logic receives input from the CA agent that has authenticated the identity and manually approved the renewal. The processing logic generates a renewed certificate when the certificate renewal request is approved (block 430). After the renewed certificate is generated at block 430, the processing logic issues the renewed certificate to the requester (block 418), and the method ends.

Figure 5:
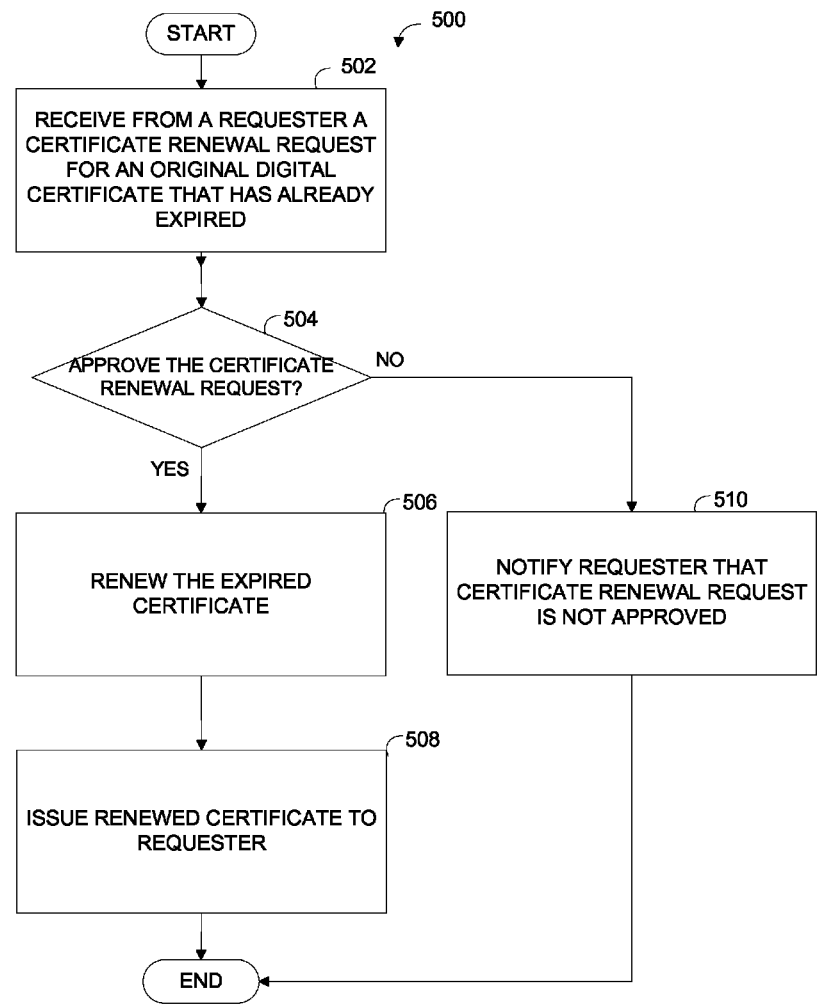
FIG. 5 is a flow diagram of one embodiment of a method of renewing an expired certificate.

FIG. 5 is a flow diagram of one embodiment of a method 500 of renewing an expired certificate. The method 500 is performed by processing logic that may comprise hardware (circuitry, dedicated logic, etc.), software (such as is run on a general purpose computer system or a dedicated machine), firmware (embedded software), or any combination thereof. In one embodiment, the method 500 is performed by the expired certificate renewal module 144 of FIGS. 1 and 3B. Alternatively, the method 500 is performed by the profile framework renewal module of FIGS. 1, 2, and 3A that implements renewal profiles for expired certificates.

Referring to FIG. 5, processing logic begins with receiving from a requester a certificate renewal request for an original digital certificate that has already expired (block 502). Processing logic determines if the certificate renewal request is approved (block 504). In one embodiment, the processing logic approves the certificate renewal request by receiving user identification information, provided by the requester, and authenticates the identity of the requester using the user identification information to determine whether to approve the certificate renewal request. For example, the processing logic may authenticate the identity of the requester against an LDAP directory using a username and password, or a LDAP user identifier and password. In another embodiment, the processing logic approves the certificate renewal request when an agent of the CA approves the certificate renewal request.

Figure 6:
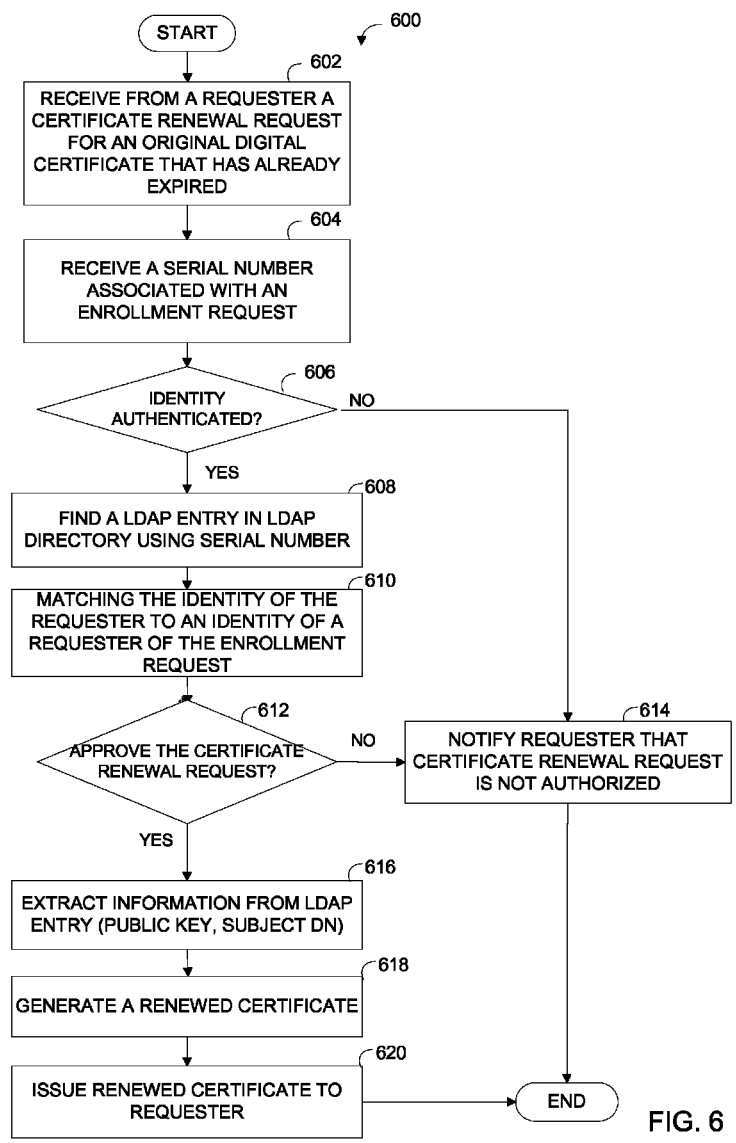
FIG. 6 is a flow diagram of one embodiment of a method of renewing an expired certificate using a serial number associated with an enrollment request.

In another embodiment, the processing logic authenticates an identity of the requester of the certificate renewal request to determine whether to approve the certificate renewal request, and receives a serial number associated with an enrollment request for the original certificate, provided by the requester to find a record of the original certificate or the enrollment request in a CA database as described and illustrated with respect to FIG. 6. Alternatively, the processing logic may extract information corresponding to the original certificate from the LDAP entry, such as, for example, a public key, a subject distinguished name, or the like. In one embodiment, the processing logic finds multiple records. In this scenario, the processing logic can select the record that includes the most recent valid certificate. In another embodiment, the processing logic, as part of approving the certificate at block 504, authenticates the identity of the requester by manually authenticating the identity of the requester of the certificate renewal request by an agent of the CA. In this embodiment, the processing logic may receive input from the agent over a network connection from an agent workstation (e.g., 130).

After authenticating the identity of the requester, the processing logic matches the identity of the requester of the certificate renewal request to an identity of a requester of the enrollment request for the original certificate. In one embodiment, the processing logic matches user identification information in the enrollment request to user identification information, provided by the requester. In another embodiment, the processing logic matches a user name of the requester to a subject DN of the original certificate. The processing logic approves the renewal when the identities match, and subsequently generates the renewed certificate using information from the record when the certificate renewal request is approved.

If the certificate renewal request is approved at block 504, the processing logic renews the expired certificate as a renewed certificate when the certificate renewal request is approved (block 506). The renewed certificate includes the same key pair as the original certificate, but includes a new expiration date. The renewed certificate is functionally identical to the original certificate. The processing logic issues the renewed certificate when the certificate renewal request is approved (block 508), and the method ends. However, if at block 504 the processing logic determines that the certificate renewal request is not approved, the processing logic notifies the requester that the certificate renewal request is not approved (block 510), and the method ends.

FIG. 6 is a flow diagram of one embodiment of a method 600 of renewing an expired certificate using a serial number associated with an enrollment request. The method 600 is performed by processing logic that may comprise hardware (circuitry, dedicated logic, etc.), software (such as is run on a general purpose computer system or a dedicated machine), firmware (embedded software), or any combination thereof. In one embodiment, the method 400 is performed by the expired certificate renewal module 144 of FIGS. 1 and 3B. Alternatively, the method 500 is performed by the profile framework renewal module of FIGS. 1, 2, and 3A that implements renewal profiles for expired certificates.

Referring to FIG. 6, processing logic begins with receiving from a requester a certificate renewal request for an original digital certificate that has already expired (block 602). The processing logic also receives a serial number associated with an enrollment request of the original certificate, provided by the requester (block 604). The processing logic authenticates the identity of the requester (block 606). If the identity of the requester is not authenticated, the processing logic notifies the requester that the certificate renewal request is not authorized (block 614). If the identity of the requester is authenticated, the processing logic finding a record (e.g., LDAP entry) of an enrollment request for the original certificate in a CA database (e.g., LDAP directory) of the certificate system using the serial number (block 608). The processing logic also matches the identity of the requester of the certificate renewal request to an identity of a requester of the enrollment request for the original certificate (block 610). The processing logic determines if the certificate renewal request is approved (block 612). In one embodiment, the processing logic approves the certificate renewal request when the identity of the requester is authenticated and the identity of the requester matches the identity of the requester of the enrollment request. If the certificate renewal request is not authorized, the processing logic notifies the requester that the certificate renewal request is not authorized (block 614). If the certificate renewal request is authorized, the processing logic extracts information from the record (e.g., LDAP entry), such as the key pair, subject DN, or the like (block 616), generates a renewed certificate using the information from the record when the certificate is approved (block 618), and issues the renewed certificate to the requester (block 620). In one embodiment, the processing logic matches the identities by matching user identification information in the enrollment request to user identification information provided by the requester, such as by matching a user name of the requester to a subject DN of the original certificate. In one embodiment, if multiple records of enrollment requests are found in the CA database (e.g., LDAP directory) using the serial number, the processing logic selects the record that has the most recent valid certificate. Alternatively, the processing logic may select one of the records based on other criteria.

Figure 7:
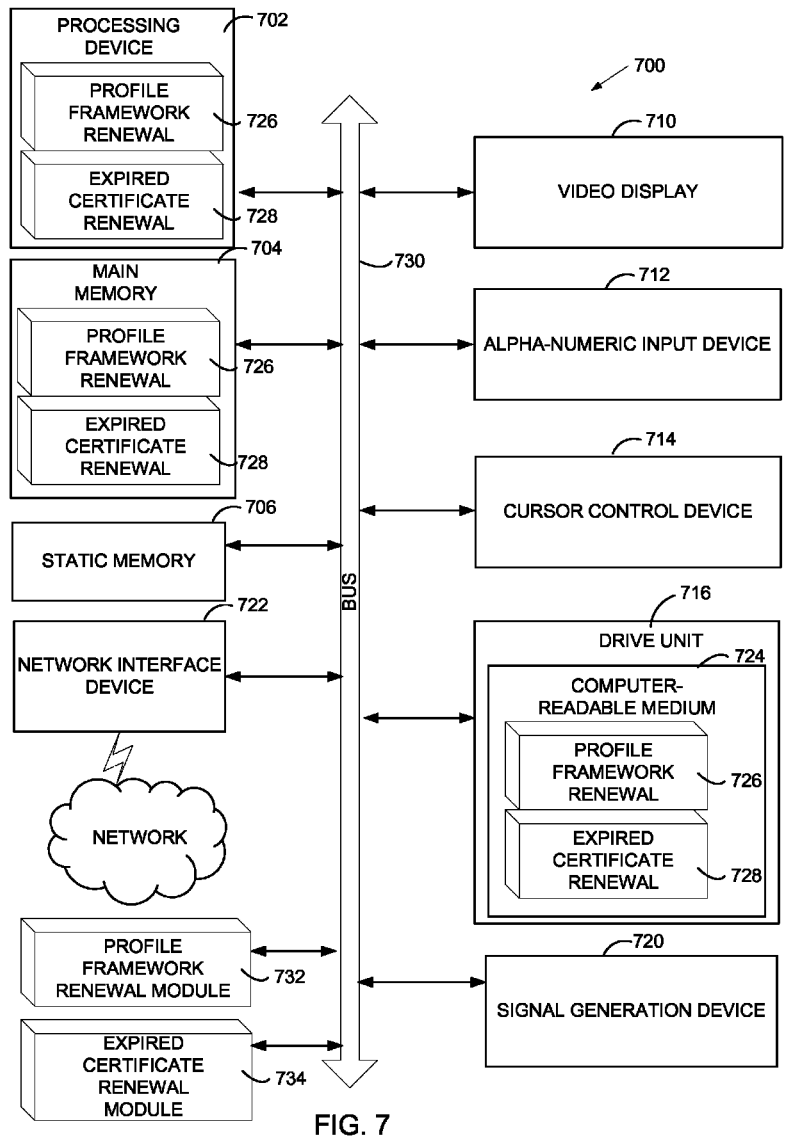
FIG. 7 illustrates a diagrammatic representation of a machine in the exemplary form of a computer system for profile framework renewal and/or expired certificate renewal.

FIG. 7 illustrates a diagrammatic representation of a machine in the exemplary form of a computer system 700 for profile framework renewal and/or expired certificate renewal. Within the computer system 700 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of the certificate renewal, such as the methods 400, 500, and 600 described above. In one embodiment, the computer system 700 represents various components that may be implemented in the CA server on which the certificate manager 125 operates as described above. Alternatively, the CA server may include more or less components as illustrated in the computer system 700.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 716, each of which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic (e.g., profile framework renewal 726 and/or expired certificate renewal 728) for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions (e.g., profile framework renewal 726 and/or expired certificate renewal 728) embodying any one or more of the methodologies or functions described herein. The profile framework renewal 726 and/or expired certificate renewal 728 may also reside, completely or at least partially, within the main memory 704 and/or within the processing device 702 during execution thereof by the computer system 700, the main memory 704 and the processing device 702 also constituting computer-readable storage media. The profile framework renewal 726 and/or expired certificate renewal 728 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The modules 732 and/or 734, components and other features described herein (for example in relation to FIGS. 1-3B) can be implemented as discrete hardware components or integrated in the functionality of hardware components such as ASICS, FPGAs, DSPs or similar devices. In addition, the modules 732 and/or 734 can be implemented as firmware or functional circuitry within hardware devices. Further, the modules 732 and/or 734 can be implemented in any combination hardware devices and software components. It should also be noted that the computer system 700 can include just the profile framework renewal module 732, or just the expired certificate renewal module 734.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
receiving, from a renewal requester via a processing device of a certificate manager, a certificate renewal request for an expired digital certificate;
receiving user identification information provided by the renewal requester in connection with the certificate renewal request;
authenticating an identity of the renewal requester, wherein the authenticating the identity of the renewal requester utilizes the received user identification information to determine whether to approve the certificate renewal request;
locating a record in a database of a Certificate Authority (CA) associated with the certificate manager, the record comprising an original certificate associated with the expired digital certificate and an original enrollment request corresponding to the original certificate;
matching the authenticated identity of the renewal requester with an original identity of an original requestor corresponding to the original certificate and a profile of the original enrollment request, wherein matching the authenticated identity further comprises matching original user identification information in the original enrollment request to the user identification information provided by the renewal requester in connection with the certificate renewal request;
approving, by the processing device, a renewal of the expired digital certificate when the identity of the renewal requester is authenticated and when the authenticated identity of the renewal requester matches the original identity of the original requestor;

renewing, by the processing device of the certificate manager, the expired digital certificate as a renewed digital certificate after the certificate renewal request is approved; and generating, by the processing device, the renewed digital certificate using information from the record, wherein the renewed digital certificate comprises a same public and private key pair as the expired digital certificate and comprises a new expiration date, and wherein the renewed digital certificate is identical to the expired digital certificate other than the new expiration date to enable the renewal requester to replace the expired digital certificate with the renewed digital certificate.

2. The method of claim 1, wherein renewing the expired digital certificate further comprises:

issuing the renewed digital certificate when the certificate renewal request is approved.

3. The method of claim 1, wherein approving the certificate renewal request comprises manually approving the certificate renewal request of the expired digital certificate by an agent of the CA.

4. The method of claim 1, wherein the authenticating the identity of the renewal requester comprises manually authenticating the identity of the renewal requester of the certificate renewal request by an agent of the CA.

5. The method of claim 1, wherein the user identification information is a username and a password to access the database of the CA comprising at least one of the expired digital certificate or the original enrollment request for the expired digital certificate, and wherein the authenticating the identity comprises authenticating the identity of the renewal requester against the CA database using the username and password.

6. The method of claim 1, wherein the user identification information is a Lightweight Directory Access Protocol (LDAP) user identifier and a password to access an LDAP directory comprising an LDAP entry of the original enrollment request for the expired digital certificate, and wherein the authenticating the identity comprises authenticating the identity of the renewal requester to the LDAP directory using the LDAP user identifier and the password.

7. The method of claim 1, wherein receiving the user identification further comprises receiving a serial number associated with the original enrollment request for the expired digital certificate, the serial number provided by the renewal requester in connection with the certificate renewal request, and wherein generating the renewed digital certificate further comprises finding the record corresponding to the original enrollment request for the expired digital certificate in the database of the CA using the serial number.

8. The method of claim 1, wherein matching the authenticated identity further comprises matching a user name of the renewal requester to a subject distinguished name (DN) of the expired digital certificate.

9. The method of claim 1, wherein receiving the user identification further comprises receiving a serial number associated with the original enrollment request for the expired digital certificate provided by the renewal requester in connection with the certificate renewal request, and wherein generating the renewed digital certificate further comprises:

finding a Lightweight Directory Access Protocol (LDAP) entry in an LDAP directory using the serial number; and extracting information corresponding to the expired digital certificate from the LDAP entry to yield extracted information that comprises the record.

10. The method of claim 1, wherein receiving the user identification further comprises receiving a serial number associated with the original enrollment request for the expired digital certificate, provided by the renewal requester in connection with the certificate renewal request, and wherein generating the renewed digital certificate further comprises:

finding a plurality of records of original enrollment requests for the expired digital certificate in a database using the serial number; and selecting one of the plurality of records comprising a most recent valid certificate to yield the record.

11. The method of claim 1, wherein generating the renewed digital certificate further comprises finding the record corresponding to the original enrollment request for the expired digital certificate in a database using the user identification information.

12. A certificate system comprising:

a processing device communicably coupled to a memory;

a data storage device communicably coupled to the processing device, the data storage device to store data concerning a plurality of digital certificates issued by a certificate authority (CA); and a certificate manager executable from the memory by the processing device and communicably coupled to the data storage device, the certificate manager to:

receive, from a renewal requester, a certificate renewal request for an expired digital certificate;

receive user identification information provided by the renewal requester in connection with the certificate renewal request;

authenticate an identity of the renewal requester, wherein the authenticating the identity of the renewal requester utilizes the received user identification information to determine whether to approve the certificate renewal request;

locate a record in a database of a Certificate Authority (CA) associated with the certificate manager, the record comprising an original certificate associated with the expired digital certificate and an original enrollment request corresponding to the original certificate;

match the authenticated identity of the renewal requester with an original identity of an original requestor corresponding to the original certificate and a profile of the original enrollment request, wherein matching the authenticated identity further comprises matching original user identification information in the original enrollment request to the user identification information provided by the renewal requester in connection with the certificate renewal request;

approve a renewal of the expired digital certificate when the identity of the renewal requester is authenticated and when the authenticated identity of the renewal requester matches the original identity of the original requestor;

renew the expired digital certificate as a renewed digital certificate after the certificate renewal request is approved: and generate the renewed digital certificate using information from the record, wherein the renewed digital certificate comprises a same public and private key pair as the expired digital certificate and comprises a new expiration date, and wherein the renewed digital certificate is identical to the expired digital certificate other than the new expiration date to enable the renewal requester to replace the expired digital certificate with the renewed digital certificate.

13. The system of claim 12, wherein the certificate manager comprises an expired digital certificate renewal module to receive the certificate renewal request from the renewal requester, approve the certificate renewal request, and to issue the renewed digital certificate when the certificate renewal request is approved.

14. The system of claim 13, wherein the expired digital certificate renewal module comprises:
- a user interface to receive the certificate renewal request from the renewal requester;
- an authentication module to authenticate the identity of the renewal requester;
- a matching module to match the identity of the renewal requester with the original identity associated with the original enrollment request for the original certificate; and
- an authorization and certificate issuance module to authorize and issue the renewed digital certificate when the certificate renewal request is approved.

15. The system of claim 12, wherein the certificate manager comprises an agent interface to receive input from an agent of the CA to manually approve the certificate renewal request of the expired digital certificate.

16. The system of claim 12, wherein the certificate manager comprises an end-entity (EE) interface to receive the user identification information from the renewal requester in connection with the certificate renewal request.

17. The system of claim 16, wherein the user identification information is a username and a password to access the database of the CA, the database comprising at least one of the expired digital certificate or the original enrollment request for the expired digital certificate, and wherein the certificate manager is to authenticate the identity of the renewal requester against the database using the username and the password.

18. The system of claim 12, wherein the data storage device is a Lightweight Directory Access Protocol (LDAP) repository that stores LDAP entries of an LDAP directory, wherein the certificate manager comprises an interface to receive the user identification information comprising a serial number associated with the original enrollment request for the expired digital certificate, provided by the renewal requester in connection with the certificate renewal request, and wherein the certificate manager is to:
- authenticate the identity of the renewal requester against the LDAP directory;
- find an LDAP entry in the LDAP directory using the serial number;
- extract information corresponding to the expired digital certificate from the LDAP entry, wherein the information comprises a key pair and a subject distinguished name, and wherein the extracted information comprises the record; and
- issue the generated renewed digital certificate when the certificate renewal request is approved and generated.

19. A non-transitory machine-readable storage medium having instructions, which when executed by a processing device, cause the processing device to:
- receive, from a renewal requester via a certificate manager comprising the processing device, a certificate renewal request for an expired digital certificate;
- receive user identification information provided by the renewal requester in connection with the certificate renewal request;
- authenticate an identity of the renewal requester, wherein the authenticating the identity of the renewal requester utilizes the received user identification information to determine whether to approve the certificate renewal request;
- locate a record in a database of a Certificate Authority (CA) associated with the certificate manager, the record comprising an original certificate associated with the expired digital certificate and an original enrollment request corresponding to the original certificate;
- match the authenticated identity of the renewal requester with an original identity of an original requestor corresponding to the original certificate and a profile of the original enrollment request, wherein matching the authenticated identity further comprises matching original user identification information in the original enrollment request to the user identification information provided by the renewal requester in connection with the certificate renewal request;
- approve, by the processing device, a renewal of the expired digital certificate when the identity of the renewal requester is authenticated and when the authenticated identity of the renewal requester matches the original identity of the original requestor;
- renew, by the processing device of the certificate manager, the expired digital certificate as a renewed digital certificate after the certificate renewal request is approved; and
- generate, by the processing device, the renewed digital certificate using information from the record, wherein the renewed digital certificate comprises a same public and private key pair as the expired digital certificate and comprises a new expiration date, and wherein the renewed digital certificate is identical to the expired digital certificate other than the new expiration date to enable the renewal requester to replace the expired digital certificate with the renewed digital certificate.

20. The non-transitory machine-readable storage medium of claim 19, wherein the processing device to renew the expired digital certificate further comprises the processing device to issue the renewed digital certificate when the certificate renewal request is approved.

* * * * *